Patented Aug. 1, 1944

2,354,876

UNITED STATES PATENT OFFICE 2,354,876

METHOD OF TREATING CEMENTITIOUS OBJECTS

Calvin Arthur Owens, Los Angeles, Calif.

No Drawing. Application May 20, 1941,
Serial No. 394,363

7 Claims. (Cl. 117—123)

This invention pertains to methods of treating cementitious bodies and objects for the purpose of increasing the water-tightness and impermeability of such bodies and for the purpose of preventing, retarding or ameliorating efflorescence, surface checking, cracking or crazing. Generally stated, the invention pertains to a treatment of cementitious bodies and objects (generally made from a hydraulic cement composition) with a solution containing a reagent hereinafter described in greater detail.

This application is a continuation-in-part of a co-pending application Serial No. 260,743 filed March 9, 1939, entitled "Treatment of hydraulic cement compositions."

Hydraulic cements, generally known as Portland cements, contain a number of silicates and aluminates, some of which involve calcium, this being generally referred to as lime. Part of this calcium or lime is combined with the silica, alumina and other components, in relatively stable form, while another part may be readily hydrolyzable or in the form of oxide, hydroxide or carbonate, these rather reactive and readily hydrolyzable portions being the source of what is termed free or available lime. The permeability of hydraulic cement compositions and their susceptibility to the action of water are believed to be due, in part at least, to the presence of free lime or soluble constituents which are readily leached out of the cementitious bodies, resulting in a porous mass which can be disrupted readily by ice formation, growth of salt and sulfate crystals in such pores, etc.

Furthermore, porosity or permeability of the compositions permits the water to gain access to whatever steel, iron or other metal is contained within or covered by the hydraulic cement composition, the moisture, together with its contained salts, forming an electrolyte which accelerates and renders possible corrosion of such steel, iron or other metal. The corrosion in turn results in the formation of oxides and an increase in volume which causes spalling and further exposure of the metals.

In the parent application for Letters Patent above noted (of which this is a continuation-in-part) the preparation of hydraulic cement compositions in such manner that the resulting cementitious bodies are relatively impervious to the passage of water and other liquids has been described. This application is primarily directed to the treatment of previously formed objects, such as for example, existing walls, roads, foundations, roofs, pipe and other structures or objects made from or composed in large part at least, of hydraulic cement or hydraulic cement compositions. For example, the present invention is applicable to the treatment of cement pipe or tanks made from cementitious compositions, whether such pipe or tanks have been made from the usual hydraulic cement compositions or from cement compositions previously treated in accordance with the invention described in the parent application for Letters Patent.

Generally stated, the present invention is based upon the discovery that by making a water solution of certain metallic compounds, such as water solutions of compounds of chromium, molybdenum, tungsten or vanadium, and applying such solutions to previously formed hydraulic cement surfaces and objects, such objects may be rendered much more impervious to the passage of water therethrough than prior to such treatment.

An object of this invention, therefore, is to disclose and provide a method of converting relatively soluble constituents of hydraulic cement or cementitious compositions into relatively insoluble compounds which are retained within the compositions or bodies and which retard subsequent penetration of such bodies by other soluent solutions. Other objects, advantages, characteristics, uses and adaptations of the invention will be made evident to those skilled in the art from the description given herein.

In accordance with the present invention the treating agent to be used comprises a solution containing a water-soluble compound of chromium, molybdenum, tungsten or vanadium, or any mixture thereof. Compounds employed should not be strongly basic nor strongly acidic and should not give rise to the formation of calcium compounds having large molecular volume upon crystallization with water, such as calcium sulfate, for example. Chromic anhydride, manganese trioxide, molybdic acid and ammonium salts of molybdenum, vanadium and tungsten are examples of materials which can be employed. Chromic anhydride is preferred. Chromic anhydride is often referred to as chromic acid, but irrespective of the name used, it is desirable that the substance employed in this process be able to dissolve in water to furnish, in part at least, the ions which are furnished by the addition of $CrO_3$ to water. It is believed that chromic anhydride ($CrO_3$) furnishes ions of $CrO_4$, $Cr_2O_7$, $Cr_3O_{10}$ and $Cr_4O_{13}$ in the solution, the first mentioned being the most common. Technical grades of chromic anhydride can be used.

Aqueous solutions of desired compounds from the group given hereinabove may be made either in final strength form or in concentrated form and then diluted for use in the field. Solutions containing from 1% to 20% or even more (say 30%) of chromic acid may be used in washing, spraying, swabbing, saturating or impregnating previously cast, poured or otherwise formed hydraulic cement compositions.

Floor slabs, tank walls, retaining walls, dams, and objects such as bowls, plugs, conduits and the like, may have their permeability to the passage of water greatly decreased by flooding or washing the surfaces of such masses or by spraying or dipping such bodies with or into a water solution of mineralizing reagent of the character hereinabove stated, such as chromium anhydride. Such treatment apparently results in the formation of calcium chromate and relatively insoluble chromium compounds, such as chromium hydroxide, within the porosities of the previously formed hydraulic cement masses, the relatively insoluble metallic compounds thus formed having a tendency to fill up previously existing voids and thereby increasing the resistance of the object of structure to the subsequent penetration of water thereinto. The treatment is particularly adapted to the use of objects which have not been surfaced or finished.

After the object has been swabbed, impregnated or otherwise treated with the solution in accordance with the present invention, it is desirable that such object be permitted to thoroughly dry before being placed into service, many of the compounds formed becoming highly insoluble after they have been dried even though the originally formed compounds, together with their combined water, are somewhat soluble. Large structures such as dams may be treated by drilling into such structures and pumping the solutions thereinto under pressure.

The treatment herein disclosed is not limited to objects made from hydraulic cement compositions and consisting of only hydraulic cement and sand or other aggregation; the treatment is also applicable to objects made from compositions containing any appreciable amount of hydraulic cement. For example, composition shingles containing only 15% to 20% of hydraulic cement and a high proportion of other ingredients, such as asbestos fiber, may be rendered highly moisture resistant by being treated with a 15% solution of chromic acid.

In some instances, it may be desirable to carry out the impregnation under vacuum conditions. That is, the object to be impregnated may be placed into a closed receptacle, the air evacuated from such receptacle and a solution then admitted into the receptacle so as to completely fill the porosities. Thereafter the suction may be discontinued and the receptacle opened so as to permit the object to be withdrawn from the solution.

Those skilled in the art will appreciate from the above description that numerous changes, modifications and adaptations can be made in the use of the invention and that all changes and adaptations coming within the scope of the following claims are embraced thereby.

I claim:

1. A method of reducing the permeability of hydraulic cement bodies which comprises: treating the surface of such bodies with a water solution of chromic anhydride.

2. A method of increasing the strength and water resistance of objects made from hydraulic cement compositions which comprises: treating such objects with an aqueous solution containing a water-soluble reagent from the group consisting of chromic anhydride, manganese trioxide, and molybdic acid.

3. A method of increasing the strength and water resistance of objects made from hydraulic cement compositions which comprises: treating such objects with an aqueous solution containing a water-soluble reagent from the group consisting of chromic anhydride, manganese trioxide, and molybdic acid and then permitting the objects to dry.

4. A method of increasing the water resistance of objects made from hydraulic cement compositions which comprises: wetting the objects with an aqueous solution containing from about 5% to 25% by weight of chromic acid.

5. A method of increasing the water resistance of objects made from hydraulic cement compositions which comprises: wetting the objects with an aqueous solution containing from about 5% to 25% by weight of chromic acid and then drying such objects.

6. A method of increasing the water resistance of objects made from hydraulic cement compositions which comprises: impregnating the objects with an aqueous solution containing from about 5% to 25% by weight of chromic acid.

7. A method of increasing the water resistance of objects made from hydraulic cement compositions which comprises: impregnating the objects with an aqueous solution containing from about 5% to 25% by weight of chromic acid and then drying such objects.

CALVIN ARTHUR OWENS.